United States Patent
Kumar

(10) Patent No.: US 8,779,973 B2
(45) Date of Patent: Jul. 15, 2014

(54) SATELLITE SIGNAL TRACKING METHOD, POSITION CALCULATING METHOD, AND POSITION CALCULATING DEVICE

(75) Inventor: Anand Kumar, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 13/022,532

(22) Filed: Feb. 7, 2011

(65) Prior Publication Data

US 2011/0193741 A1  Aug. 11, 2011

(30) Foreign Application Priority Data

Feb. 8, 2010  (JP) .................................. 2010-025835

(51) Int. Cl.
*G01S 19/24* (2010.01)
*G01S 19/26* (2010.01)

(52) U.S. Cl.
CPC *G01S 19/24* (2013.01); *G01S 19/26* (2013.01)
USPC .................................. 342/357.63; 342/357.64

(58) Field of Classification Search
CPC .................................. G01S 19/24; G01S 19/26
USPC .......................................... 342/357.63, 357.64
See application file for complete search history.

(56) References Cited

U.S. PATENT DOCUMENTS

| 7,027,488 | B2 | 4/2006 | Dooley et al. |
| 7,257,417 | B1 * | 8/2007 | Krasner ...................... 455/456.3 |
| 8,212,720 | B2 * | 7/2012 | Waters et al. ............. 342/357.42 |
| 2005/0041724 | A1 * | 2/2005 | Chansarkar .................. 375/149 |
| 2007/0273582 | A1 * | 11/2007 | Klinghult et al. ......... 342/357.06 |

FOREIGN PATENT DOCUMENTS

| JP | 63-290982 A | 11/1988 |
| JP | 04-065687 A | 3/1992 |
| JP | 2004-513354 A | 4/2004 |
| JP | 2006-349587 A | 12/2006 |
| JP | 2008-232761 A | 10/2008 |

* cited by examiner

*Primary Examiner* — Gregory C Issing
(74) *Attorney, Agent, or Firm* — Kilpatrick Townsend & Stockton LLP

(57) ABSTRACT

A satellite signal tracking method includes: detecting a situation of movement; calculating an error of the detection; and setting a loop bandwidth of a tracking filter, which is used to track a satellite signal received from a positioning satellite and of which the loop bandwidth can be changed, using the detection result and the calculated error.

8 Claims, 8 Drawing Sheets

| FILTER ORDER | DYNAMIC STRESS CALCULATING QUANTITY |
|---|---|
| FIRST ORDER | VELOCITY & SUPPOSABLE MAXIMUM VELOCITY ERROR |
| SECOND ORDER | ACCELERATION & SUPPOSABLE MAXIMUM ACCELERATION ERROR |
| THIRD ORDER | JERK & SUPPOSABLE MAXIMUM JERK ERROR |
| ⋮ | ⋮ |

FIG. 3

| RECEPTION ENVIRONMENT | SIGNAL STRENGTH |
|---|---|
| A | Sa |
| B | Sb |
| C | Sc |
| D | Sd |
| ⋮ | ⋮ |

FIG. 8

SATELLITE SIGNAL TRACKING METHOD, POSITION CALCULATING METHOD, AND POSITION CALCULATING DEVICE

BACKGROUND

1. Technical Field

The present invention relates to a satellite signal tracking method, a position calculating method, and a position calculating device.

2. Related Art

A global positioning system (GPS) is known as a positioning system using a positioning signal and is used in a position calculating device built in a mobile phone or a car navigation apparatus. The GPS performs a position calculating operation of calculating a position coordinate and a clock error of the position calculating device on the basis of information and the like on positions of plural GPS satellites or pseudo distances from the GPS satellites to the position calculating device.

GPS satellite signals transmitted from the GPS satellites are modulated with spread codes, which are different depending on the GPS satellites and called C/A (Coarse/Acquisition) codes. In order to capture a GPS satellite signal from week reception signals, the position calculating device performs a correlating operation of correlating the reception signals with replica codes which are replicas of the C/A codes and captures the GPS satellite signal on the basis of the correlation values. When the position calculating device once successfully captures the GPS satellite signal, it tracks the captured GPS satellite signal.

The tracking of the GPS satellite signal is carried out by a carrier tracking loop circuit tracking carrier waves (carriers) or a code tracking loop circuit tracking phases of the C/A codes (for example, JP-A-2008-232761).

In a loop circuit, it is known that a noise element coexists in a signal due to various reasons. In order to remove the noise element, the loop circuit is generally provided with a loop filter such as a low-pass filter.

Particularly, resistance to a jitter (an offset of a signal in the time axis direction, a phase variation, or a frequency variation) is almost determined depending on the loop filter. When the loop bandwidth of the loop filter is narrowed, the resistance to the jitter is improved but a part of a signal component may be cut. Accordingly, there is a problem in that a signal tracking property deteriorates and a lock failure of losing a captured GPS satellite signal can be easily caused in some extreme cases. On the contrary, when the loop bandwidth is widened, the resistance to the jitter is lowered and thus the position calculating device may be in a non-lockable state (where "lock" means tracking a GPS satellite signal) in some extreme cases.

In the related art, the value of the loop bandwidth is fixedly determined in consideration of the balance at the time of designing the loop filter and then the loop filter is constructed. However, the jitter introduced thereto can vary due to noise elements such as thermal noise or dynamic stress. Particularly, the dynamic stress can greatly vary depending on the situation of movement of the position calculating device. Accordingly, when the fixed loop bandwidth is used, there may be a problem in that the tracking property of tracking a GPS satellite signal is lowered.

SUMMARY

An advantage of some aspects of the invention is that it provides a technique of setting a loop bandwidth of a loop filter for tracking a satellite signal to a proper value.

According to a first aspect of the invention, there is provided a satellite signal tracking method including: detecting a situation of movement; calculating an error of the detection; and setting a loop bandwidth of a tracking filter, which is used to track a satellite signal received from a positioning satellite and of which the loop bandwidth can be changed, using the detection result and the calculated error.

As another aspect of the invention, there can be configured a satellite signal tracking device including: a detecting unit that detects a situation of movement; and a setter that sets a loop bandwidth of a tracking filter, which is used to track a satellite signal received from a positioning satellite and of which the loop bandwidth can be changed, using the detection result of the detecting unit and the detection error of the detecting unit.

According to the first aspect and the like, the situation of movement is detected and the error in detecting the situation of movement is calculated. The loop bandwidth of the tracking filter, which is used to track the satellite signal received from a positioning satellite and of which the loop bandwidth can be changed, is set using the detection result of the situation of movement and the detection error.

As described above, the jitter of a loop circuit can greatly vary depending on the situation of movement. Accordingly, it is preferable that the loop bandwidth of the tracking filter can be set using the detection result of the situation of movement. However, an error can be naturally included in the detection result of the situation of movement. Accordingly, by setting the loop bandwidth in consideration of the detection error of the situation of movement in addition to the detection result of the situation of movement, it is possible to set the loop bandwidth to a proper value.

A second aspect of the invention is directed to the satellite signal tracking method according to the first aspect, wherein the detecting of the situation of movement includes performing a calibration process on an output of any one of an acceleration sensor, a velocity sensor, and a gyro sensor at a given time, and the calculating of the error may include calculating the error using an elapsed time after performing the calibration process.

According to this configuration, the calibration process is performed on the output of any one of the acceleration sensor, the velocity sensor, and the gyro sensor at a given time. The detection error of the situation of movement is calculated using the elapsed time after performing the calibration process. By performing the calibration process, it is possible to reset the detection error of the situation of movement. By using the elapsed time after performing the calibration process, it is possible to easily calculate the detection error of the situation of movement, thereby contributing to the proper setting of the loop bandwidth.

A third aspect of the invention is directed to the satellite signal tracking method of the first or second aspect, wherein the setting of the loop bandwidth includes setting the loop bandwidth using a reception environment of the satellite signal.

According to this configuration, it is possible to set a proper loop bandwidth depending on the reception environment of the satellite signal.

A fourth aspect of the invention is directed to the satellite signal tracking method of any of the first to third aspects, wherein the setting of the loop bandwidth includes setting the loop bandwidth using a filter order of the tracking filter.

According to this configuration, it is possible to set a proper loop bandwidth depending on the filter order of the tracking filter.

According to a fifth aspect of the invention, there is provided a position calculating method including: tracking the satellite signal by performing the satellite signal tracking method of any of the first to fourth aspects; and calculating a position using the tracked satellite signal.

According to this configuration, it is possible to improve the accuracy in calculating a position by calculating the position using the satellite signal tracked by the above-mentioned satellite signal tracking method.

According to a sixth aspect of the invention, there is provided a position calculating device including: at least one sensor selected from an acceleration sensor, a velocity sensor, and a gyro sensor; a movement situation detecting unit that detects a situation of movement using an output of the at least one sensor; a tracking filter that is used to track a satellite signal from a positioning satellite and of which a loop bandwidth can be changed; a setter that sets the loop bandwidth of the tracking filter using the detection result of the movement situation detecting unit and the detection error of the movement situation detecting unit; and a position calculating unit that calculates a position using the satellite signal tracked by the tracking filter.

According to this configuration, the situation of movement is detected by the movement situation detecting unit on the basis of the output of at least one sensor of the acceleration sensor, the velocity sensor, and the gyro sensor. The loop bandwidth of the tracking filter, which is used to track the satellite signal from a positioning satellite and of which the loop bandwidth can be changed, is set by the setter on the basis of the detection result of the movement situation detecting unit and the detection error of the movement situation detecting unit. The position is calculated by the position calculating unit on the basis of the satellite signal tracked by the tracking filter. Accordingly, this aspect has the same advantages as described above.

BRIEF DESCRIPTION OF THE DRAWINGS

The invention will be described with reference to the accompanying drawings, wherein like numbers reference like elements.

FIG. 3 is a diagram illustrating correlations of dynamic stress calculating quantities with orders of a loop filter.

FIG. 8 is a diagram illustrating the structure of a signal strength determining table.

DESCRIPTION OF EXEMPLARY EMBODIMENTS

Hereinafter, an embodiment of the invention which is applied to a mobile phone as a kind of electronic apparatus having a satellite signal tracking device and a position calculating device will be described with reference to the accompanying drawings. The invention is not limited to the below-described embodiment.

1. Functional Configuration

Figure 1:
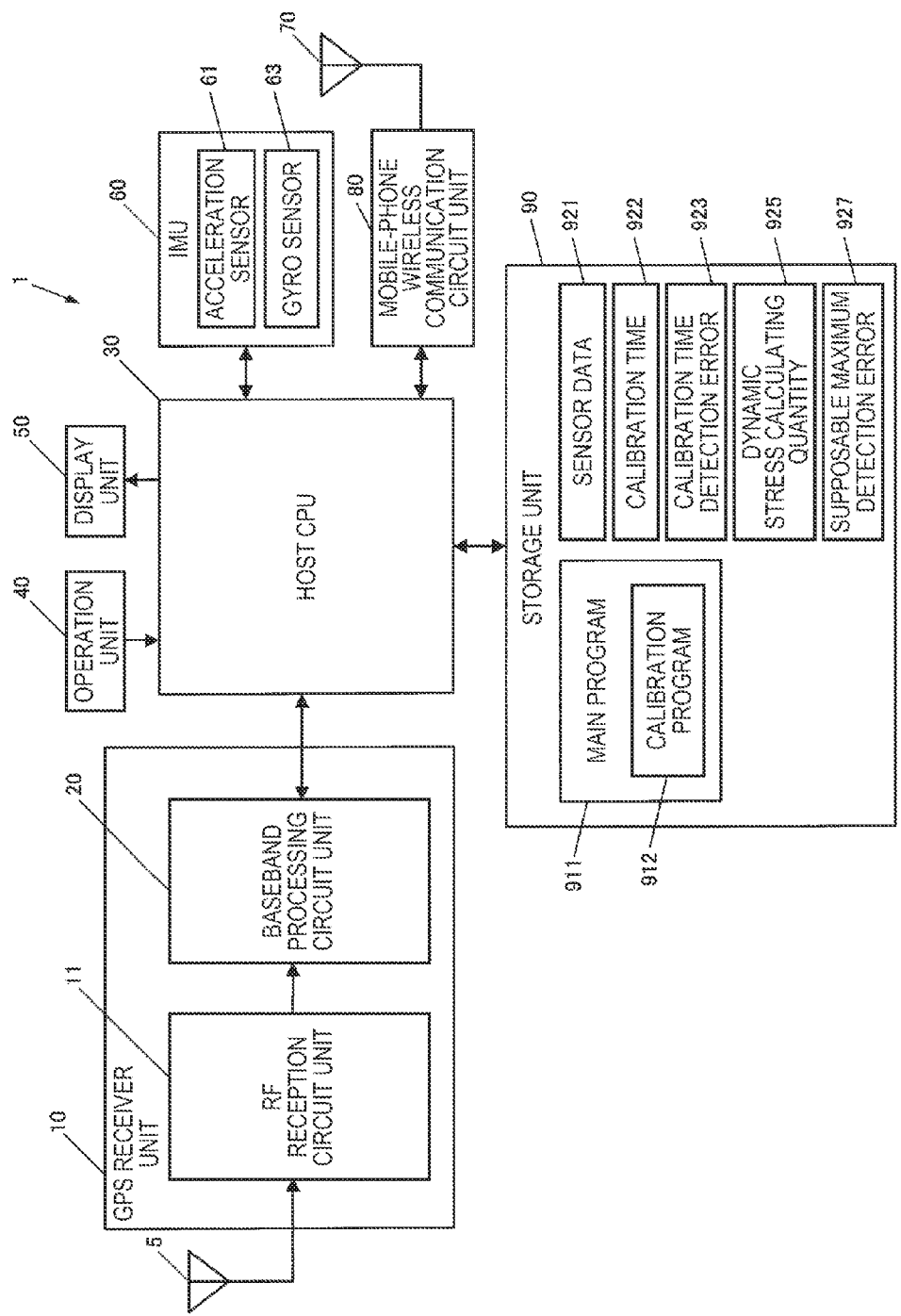
FIG. 1 is a block diagram illustrating the functional configuration of a mobile phone.

FIG. 1 is a block diagram illustrating the functional configuration of a mobile phone 1 according to an embodiment of the invention. The mobile phone 1 includes a GPS antenna 5, a GPS receiver unit 10, a host CPU (Central Processing Unit) 30, an operation unit 40, a display unit 50, an IMU (Inertial Measurement Unit) 60, a mobile-phone antenna 70, a mobile-phone wireless communication circuit unit 80, and a storage unit 90.

The GPS antenna 5 is an antenna that receives an RF (Radio Frequency) signal including a GPS satellite signal emitted from a GPS satellite as a kind of positioning satellite, and outputs the received signal to the GPS receiver unit 10. The GPS satellite signal is a communication signal of 1.57542 GHz modulated by a CDMA (Code Division Multiple Access) method known as a spectrum spread method using a C/A (Coarse/Acquisition) code which is a kind of spread code. The C/A code is a pseudo random noise code with a repetition period of 1 ms using a chip with a code length of 1023 as 1 PN frame and varies depending on the GPS satellites.

The GPS receiver unit 10 is a position calculating circuit or a position calculating device that measures the position of the mobile phone 1 on the basis of the signal output from the GPS antenna 5 and is a functional block corresponding to a so-called GPS receiver. The GPS receiver unit 10 includes an RF reception circuit unit 11 and a baseband processing circuit unit 20. The RF reception circuit unit 11 and the baseband processing circuit unit 20 may be formed as individual LSI (Large Scale Integration) chips or as a single chip.

The RF reception circuit unit 11 is a reception circuit of an RF signal. Regarding the circuit configuration, the RF signal output from the GPS antenna 5 may be converted into a digital signal through the use of an AD converter and the digital signal may be processed. Alternatively, the RF signal output from the GPS antenna 5 may be processed with its analog state maintained and may be finally A/D converted into a digital signal and then the digital signal may be output to the baseband processing circuit unit 20.

In the latter, for example, the RF reception circuit unit 11 may be constructed as follows. That is, by dividing or multiplying a predetermined oscillation signal, an oscillation signal to be multiplied by the RF signal is generated. The RF signal is down-converted into an intermediate frequency signal (hereinafter, referred to as "IF (Intermediate Frequency) signal") by multiplying the generated oscillation signal by the RF signal output from the GPS antenna 5, the IF signal is amplified or the like, the resultant signal is converted into a digital signal through the use of an AD converter, and the digital signal is output to the baseband processing circuit unit 20.

The baseband processing circuit unit 20 is a functional unit that performs a correlation process and the like on the reception signal output from the RF reception circuit unit 11 to capture and track the GPS satellite signal and performs a predetermined position calculating process on the basis of satellite orbit data or time data extracted from the GPS satellite signal to calculate the position (position coordinate) of the mobile phone 1.

The baseband processing circuit unit 20 serves as a satellite signal capturing device that captures the GPS satellite signal from the reception signal and also serves as a satellite signal tracking device that tracks the captured GPS satellite signal. The position and the velocity of the mobile phone 1 are calculated by performing the position and velocity calculating process using the GPS satellite signal.

Figure 2:
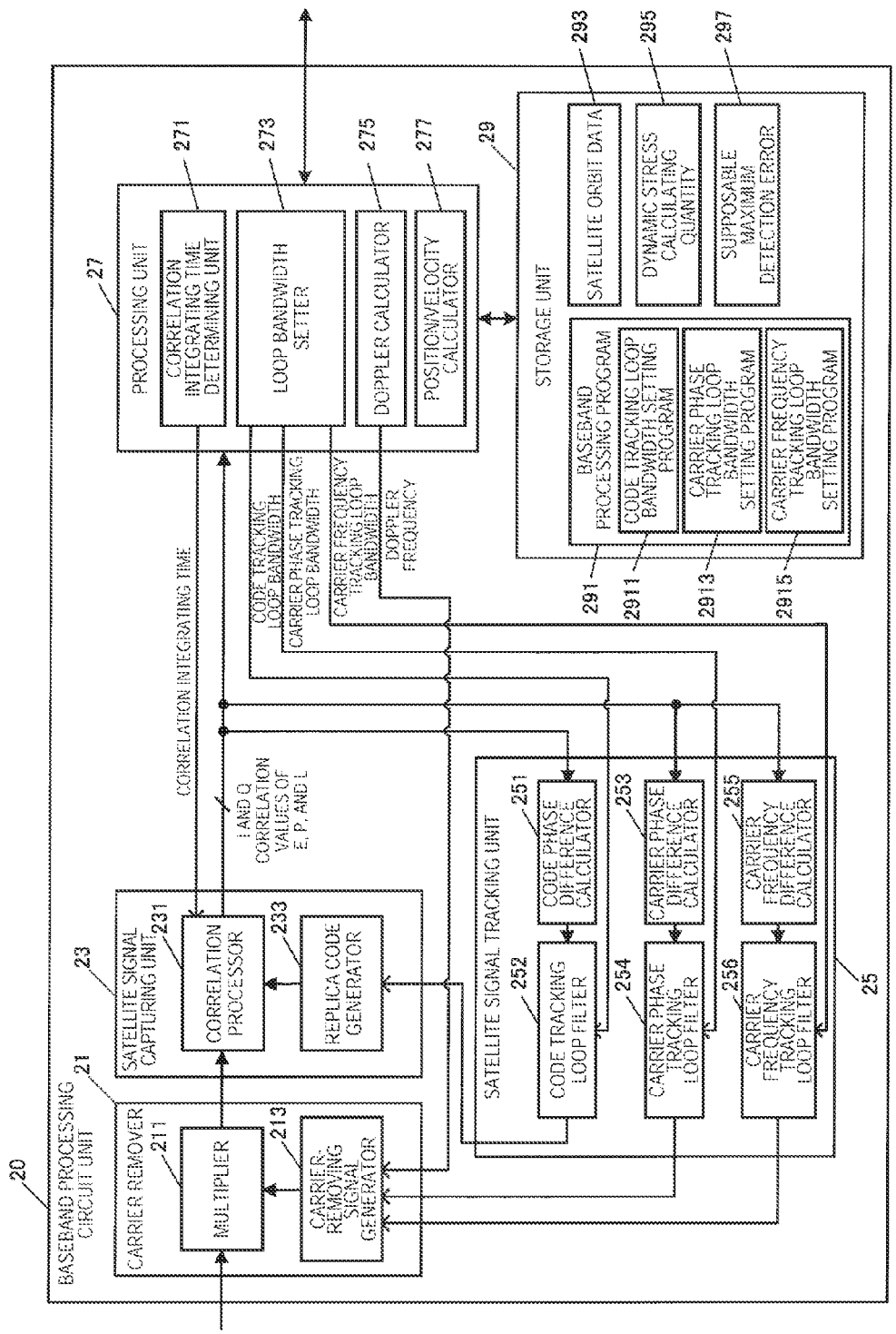
FIG. 2 is a block diagram illustrating the circuit configuration of a baseband processing circuit unit.

FIG. 2 is a diagram illustrating the circuit configuration of the baseband processing circuit unit 20 and mainly illustrates the circuit blocks associated with this embodiment. The baseband processing circuit unit 20 includes a carrier remover 21, a satellite signal capturing unit 23, a satellite signal tracking unit 25, a processing unit 27, and a storage unit 29.

The carrier remover 21 is a circuit unit that removes carrier waves (carriers) from the reception signal output from the RF reception circuit unit 11 and includes, for example, a multiplier 211 and a carrier-removing signal generator 213.

The multiplier 211 is a multiplier that multiplies the carrier-removing signal generated from the carrier-removing signal generator 213 by the reception signal to remove the carrier waves from the reception signal and outputs the C/A code (reception C/A code) included in the reception signal to the correlation processor 231.

The carrier-removing signal generator 213 is a circuit that generates the carrier-removing signal which is a signal with the same frequency as the carrier signal of the GPS satellite signal. When the signal output from the RF reception circuit unit 11 is an IF signal, the signal is generated using the IF frequency as a carrier frequency. The carrier-removing signal with the same frequency as the frequency of the signal output from the RF reception circuit unit 11 is generated in any case.

In the following description, the frequency of the signal output from the RF reception circuit unit 11 is referred to as a "carrier frequency" or a "carrier wave frequency" and the phase of the carrier (carrier wave) component of the signal output from the RF reception circuit unit 11 is referred to as a "carrier phase".

The carrier-removing signal generator 213 adjusts the phase and frequency of the signal to be generated in accordance with a carrier phase instructing signal output from the carrier phase tracking loop filter 254 and a carrier frequency instructing signal output from the carrier frequency tracking loop filter 256, generates the carrier-removing signal, and outputs the generated carrier-removing signal to the multiplier 211.

At this time, the carrier-removing signal generator 213 generates the carrier-removing signal in consideration of the Doppler frequency output from the Doppler calculator 275. The frequency when the GPS receiver unit 10 receives the GPS satellite signal is not necessarily equal to 1.57542 GHz which is a prescribed carrier frequency of the GPS satellite signal due to the Doppler influence resulting from the movement of the GPS satellite or the movement of the mobile phone 1. Accordingly, the carrier-removing signal with a frequency obtained by adding the Doppler frequency to the prescribed carrier frequency is generated and output to the multiplier 211.

The satellite signal capturing unit 23 is a circuit unit that captures the GPS satellite signal from the reception signal from which the carrier waves are removed and which is output from the multiplier 211, and includes a correlation processor 231 and a replica code generator 233.

The correlation processor 231 includes, for example, a correlator and is a circuit unit that correlates the replica codes generated by the replica code generator 233 with the received C/A codes output from the multiplier 211. The correlation processor 231 integrates the correlation values over a correlation integrating time output from the correlation integrating time determining unit 271 and outputs the integration result to the processing unit 27.

The replica code generator 233 is a circuit unit that generates replica codes (CA code replicas) of the C/A codes which are spread codes of the GPS satellite signal. The replica code generator 233 generates three types of replica code of Early, Prompt, and Late in accordance with a code phase instructing signal output from the code tracking loop filter 252. The generated three types of replica code are output to the correlation processor 231.

In this embodiment, the correlation processor 231 performs a correlation process with the replica code input from the replica code generator 233 on I and Q components of the reception signal. The I component represents an in-phase component (real part) of the reception signal and the Q component represents an orthogonal component (imaginary part) of the reception signal. Since three types of replica code of Early, Prompt, and Late are output from the replica code generator 233, the correlation processor 231 performs the correlation process with three types of replica code on the I and Q components of the reception signal.

The circuit block that separates the I and Q components of the reception signal (I and Q separation) is not shown and may have any circuit configuration. For example, when the RF reception circuit unit 11 down-converts the reception signal into the IF signal, the I and Q separation may be carried out by multiplying a local oscillation signal with phases different by 90 degrees by the reception signal.

The satellite signal tracking unit 25 is a circuit unit tracking the GPS satellite signal captured by the satellite signal capturing unit 23 and includes a code phase difference calculator 251, a code tracking loop filter 252, a carrier phase difference calculator 253, a carrier phase tracking loop filter 254, a carrier frequency difference calculator 255, and a carrier frequency tracking loop filter 256.

The code phase difference calculator 251 is a phase comparator calculating and outputting a phase difference (hereinafter, referred to as a "code phase difference") between the phase of the received C/A code and the phase of the replica code. The code phase difference calculator 251 calculates power for the Early code and power for the Late code using the I and Q correlation value for the Early code output from the correlation processor 231 and the I and Q correlation value for the Late code. The code phase difference calculator 251 calculates the code phase difference by a known calculation method using the calculated power, generates a signal (voltage) corresponding to the calculated code phase difference, and outputs the generated signal to the code tracking loop filter 252.

The code tracking loop filter 252 is a filter circuit that includes, for example, a low-pass filter and that is designed to change a loop bandwidth as a parameter for determining a frequency band component of a signal to be transmitted, that is, designed to adjust the loop bandwidth. The code tracking loop filter 252 sets the loop bandwidth on the basis of the loop bandwidth output from the loop bandwidth setter 273. That is, the loop bandwidth is changed on the basis of the loop bandwidth output from the loop bandwidth setter 273. Then, the code tracking loop filter 252 cuts out a high-frequency component included in the signal corresponding to the code phase difference output from the code phase difference calculator 251 and outputs the resultant signal to the replica code generator 233. The loop bandwidth of the code tracking loop filter 252 is properly shown and described as "code tracking loop bandwidth".

A loop circuit for tracking a code phase, which is known as a delay locked loop (DLL), is constructed by the closed circuit including the correlation processor 231→the code phase difference calculator 251→the code tracking loop filter 252→the replica code generator 233→the correlation processor 231.

The carrier phase difference calculator 253 is a phase comparator that calculates and outputs a phase difference (hereinafter, referred to as a "carrier phase difference") between the phase of the carrier component of the reception signal and the phase of the carrier-removing signal generated by the carrier-removing signal generator 213. The carrier phase difference calculator 253 calculates the carrier phase difference by a known calculation method using the I and Q correlation values with the Early, Prompt, and Late codes output from the correlation processor 231. The carrier phase difference calculator 253 generates a signal (voltage) corresponding to the calculated carrier phase difference and outputs the generated signal to the carrier phase tracking loop filter 254.

The carrier phase tracking loop filter 254 sets the loop bandwidth on the basis of the carrier phase tracking loop bandwidth output from the loop bandwidth setter 273. The carrier phase tracking loop filter 254 cuts out a high-frequency component included in the signal corresponding to the carrier phase difference output from the carrier phase difference calculator 253 and outputs the resultant signal to the carrier-removing signal generator 213, similarly to the code tracking loop filter 252. The loop bandwidth of the carrier phase tracking loop filter 254 is properly shown and described as "carrier phase tracking loop bandwidth".

A loop circuit for tracking a carrier phase, which is known as a phase locked loop (PLL), is constructed by the closed circuit including the multiplier 211→the correlation processor 231→the carrier phase difference calculator 253→the carrier phase tracking loop filter 254→the carrier-removing signal generator 213→the multiplier 211.

The carrier frequency difference calculator 255 is a frequency comparator that calculates and outputs a frequency difference (hereinafter, referred to as a "carrier frequency difference") between the carrier frequency and the frequency of the carrier-removing signal generated by the carrier-removing signal generator 213. The carrier frequency difference calculator 255 calculates the carrier frequency difference by a known calculation method using the I and Q correlation values with the Early, Prompt, and Late codes output from the correlation processor 231. The carrier frequency difference calculator 255 generates a signal (voltage) corresponding to the calculated carrier frequency difference and outputs the generated signal to the carrier frequency tracking loop filter 256.

The carrier frequency tracking loop filter 256 sets the loop bandwidth on the basis of the carrier frequency tracking loop bandwidth output from the loop bandwidth setter 273. The carrier frequency tracking loop filter 256 cuts out a high-frequency component included in the signal corresponding to the carrier frequency difference output from the carrier frequency difference calculator 255 and outputs the resultant signal to the carrier-removing signal generator 213, similarly to the code tracking loop filter 252. The loop bandwidth of the carrier frequency tracking loop filter 256 is properly shown and described as "carrier frequency tracking loop bandwidth".

A loop circuit for tracking a carrier frequency, which is known as a frequency locked loop (FLL), is constructed by the closed circuit including the multiplier 211→the correlation processor 231→the carrier frequency difference calculator 255→the carrier frequency tracking loop filter 256→the carrier-removing signal generator 213→the multiplier 211.

The processing unit 27 is a controller that comprehensively controls the functional units of the baseband processing circuit unit 20 and includes a processor such as a CPU. The processing unit 27 includes a correlation integrating time determining unit 271, a loop bandwidth setter 273, a Doppler calculator 275, and a position and velocity calculator 277 as a function unit.

The correlation integrating time determining unit 271 is a determining unit that determines the integrating time (correlation integrating time) when the correlation processor 231 performs a correlation value integrating process and outputs the determined correlation integrating time to the correlation processor 231.

The loop bandwidth setter 273 is a setter that individually determines the loop bandwidths of the loop filters included in the satellite signal tracking unit 25, and outputs the set loop bandwidths to the corresponding loop filters.

The Doppler calculator 275 is a calculator that calculates the Doppler frequency generated due to the movement of the GPS satellite and the mobile phone 1 using the velocity of the mobile phone 1 and the velocity of the GPS satellite and outputs the calculated Doppler frequency to the carrier-removing signal generator 213.

The position and velocity calculator 277 is a calculator that performs a known position and velocity calculating process using the GPS satellite signal captured by the satellite signal capturing unit 23 or tracked by the satellite signal tracking unit 25 to calculate the position and the velocity of the mobile phone 1. The position and velocity calculator 277 outputs the calculated position and velocity to the host CPU 30.

The storage unit 29 includes a memory device such as a ROM, a flash ROM, and a RAM and stores a system program of the baseband processing circuit unit 20, various programs for performing the loop bandwidth setting function, the position and velocity calculating function, and the like, and data. The storage unit 29 includes a work area temporarily storing processing data and process results of various processes.

Referring to the functional blocks shown in FIG. 1 again, the host CPU 30 is a processor that comprehensively controls the units of the mobile phone 1 in accordance with various programs such as the system program stored in the storage unit 90. The host CPU 30 causes the display unit 50 to display a map indicating a current position or uses the position coordinates for various application processes, on the basis of the position coordinates output from the baseband processing circuit unit 20.

The operation unit 40 is an input device including, for example, a touch panel or button switches and outputs the signal of the pressed key or button to the host CPU 30. Various instructions such as a call request, a mail transmitting and receiving request, and a position calculating request are input through the operation of the operation unit 40.

The display unit 50 is a display device that includes an LCD (Liquid Crystal Display) and carries out various displays based on a display signal input from the host CPU 30. A position display picture or time information is displayed on the display unit 50.

The IMU 60 includes, for example, an acceleration sensor 61 or a gyro sensor 63 and is configured to detect accelerations in axis directions of three orthogonal axes in a predetermined sensor coordinate system correlated in advance with the sensors and angular velocities about the axes. The acceleration sensor 61 and the gyro sensor 63 may be individual sensors or may be a single sensor.

The mobile-phone antenna 70 is an antenna for transmitting and receiving mobile-phone wireless signals to and from wireless base stations provided by a communication service provider of the mobile phone 1.

The mobile-phone wireless communication circuit unit 80 is a mobile-phone communication circuit unit including an RF conversion circuit and a baseband processing circuit and carries out a calling operation or a mail transmitting and receiving operation by modulating and demodulating the mobile-phone wireless signals.

The storage unit 90 is a memory device that stores the system program causing the host CPU 30 to control the mobile phone 1 or various programs or data for carrying out a calibration function of the IMU 60.

2. Principle in Setting Loop Bandwidth

The principle of the setting of the loop bandwidth performed by the loop bandwidth setter 273 of the processing unit 27 in the baseband processing circuit unit 20 will be described below.

(1) Setting of Loop Bandwidth of Carrier Phase Tracking Loop Filter

The principle of the setting of the loop bandwidth in the carrier phase tracking loop filter 254 will be first described. The existence of an error in the carrier phase to be tracked causes a problem in tracking the carrier phase in the carrier phase tracking loop circuit. The reasons for the carrier phase error are noise elements called thermal noise and dynamic stress.

The thermal noise is a noise element known as thermal noise and is noise distributed in the entire frequency band and coexisting in signals in the carrier phase tracking loop circuit. The dynamic stress is a dynamic signal variation known as dynamic stress and is a phase variation resulting from the variation in pseudo distance between the GPS receiver and the GPS satellite due to the movement of the GPS satellite and the GPS receiver.

For the purpose of specific explanation, the carrier phase variation in the carrier phase tracking loop circuit is formulated. Here, the carrier phase variation is formulated in terms of angles (deg). The total jitter "$\sigma_{PLL}$" which is the total carrier phase variation in the carrier phase tracking loop is given as Expression (1).

$$\sigma_{PLL} = \sqrt{\sigma_{tPLL}^2 + \sigma_v^2 + \theta_A^2} + \frac{\theta_{en}}{3} [deg] \quad (1)$$

In Expression (1), "$\sigma_{tPLL}$" represents the thermal noise and "$\theta_{en}$" represents the dynamic stress. "$\sigma_v$" and "$\theta_A$" represent a carrier phase variation due to vibration and a carrier phase variation due to Allan variance, respectively, but are small values which can be neglected and are not thus considered in this embodiment.

The thermal noise "$\sigma_{tPLL}$" is given as Expression (2).

$$\sigma_{tPLL} = \frac{360}{2\pi} \sqrt{\frac{B_{PLL}}{S}\left(1 + \frac{1}{2TS}\right)} [deg] \quad (2)$$

In Expression (2), "$B_{PLL}$" represents the loop bandwidth of the carrier phase tracking loop filter 254. "S" represents the signal strength of a reception signal expressed as a C/N ratio and "T" represents the correlation integrating time. It can be seen from Expression (2) that the thermal noise "$\sigma_{tPLL}$" is a value depending on the loop bandwidth "$B_{PLL}$" of the carrier phase tracking loop filter 254, the signal strength "S" of the reception signal, and the correlation integrating time "T".

The dynamic stress "$\theta_{en}$" in the carrier phase tracking loop circuit is formulated in different expressions depending on the order (the order of the loop filter) of the carrier phase tracking loop filter 254. Specifically, the dynamic stresses "$\theta_{e1}$" to "$\theta_{e3}$" in the orders of the first-order to third-order loop filters are given as Expressions (3) to (5).

$$\theta_{e1} = \alpha \cdot \frac{dR/dt}{B_{PLL}} [deg] \quad (3)$$

$$\theta_{e2} = \beta \cdot \frac{dR^2/dt^2}{B_{PLL}^2} [deg] \quad (4)$$

$$\theta_{e3} = \gamma \cdot \frac{dR^3/dt^3}{B_{PLL}^3} [deg] \quad (5)$$

In Expressions (3) to (5), "R" represents the pseudo distance between the GPS receiver and the GPS satellite. "dR/dt" represents the velocity (true velocity) of the GPS receiver in the eye direction from the GPS receiver to the GPS satellite, "$dR^2/dt^2$" represents the acceleration (true acceleration) of the GPS receiver in the eye direction, and "$dR^3/dt^3$" represents the jerk (true jerk) of the GPS receiver in the eye direction. "α", "β", and "γ" represent constants different depending on the orders of the filters.

It can be seen from Expressions (3) to (5) that the dynamic stress "$\theta_{en}$" depends on the eye-direction components of the velocity "dR/dt", the acceleration "$dR^2/dt^2$", and the jerk "$dR^3/dt^3$" of the GPS receiver depending on the orders of the loop filters. It can be also seen that the dynamic stress "$\theta_{en}$" depends on the loop bandwidth "$B_{PLL}$" of the carrier phase tracking loop filter unit 254 regardless of the orders of the filters.

The loop bandwidth setter 273 of the processing unit 27 sets the loop bandwidth of the carrier phase tracking loop filter 254 at a predetermined setting time. The setting of the loop bandwidth can be preferably carried out, for example, at periodic times (for example, once per day), or at a time when the reception environment of the GPS satellite signal is changed, or at a time when the temperature is changed by a predetermined value or more (for example, temperature change of 5° C. or more). When the loop bandwidth is set at the time when the temperature is changed by a predetermined value or more, a temperature sensor may be further provided.

The loop bandwidth setter 273 measures and acquires the signal strength "S" of the GPS satellite signal captured by the satellite signal capturing unit 23 and acquires the correlation integrating time "T" from the correlation integrating time determining unit 271, at the time when the loop bandwidth of the carrier phase tracking loop filter 254 is set. The loop bandwidth setter 273 calculates the loop bandwidth characteristic "$\sigma_{tPLL}(B_{PLL})$" of the thermal noise through the use of Expression (2) using the acquired signal strength "S" and correlation integrating time "T". The loop bandwidth characteristic is a characteristic representing how the carrier phase varies with the variation in loop bandwidth.

On the other hand, the loop bandwidth setter 273 acquires a sensor-detected value of a quantity (hereinafter, referred to as "dynamic stress calculating quantity") used to calculate the dynamic stress and a maximum detection error (hereinafter, referred to as "supposable maximum detection error") which can be included in the sensor-detected value of the dynamic stress calculating quantity from the host CPU 30 at the setting time. The loop bandwidth setter 273 calculates the loop bandwidth characteristic "$\theta_{en}(B_{PLL})$" of the dynamic stress using the acquired values.

FIG. 3 is a diagram illustrating the correlations of the orders of the loop filters and the dynamic stress calculating quantities. When the order of the loop filter is the "first order", the loop bandwidth characteristic "$\theta_{e1}(B_{PLL})$" of the dynamic stress is calculated by Expression (3) using the eye-direction velocity (velocity calculated from the sensor output) and the supposable maximum velocity error. When the order of the loop filter is the "second order", the loop bandwidth characteristic "$\theta_{e2}$ ($B_{PLL}$)" of the dynamic stress is calculated by Expression (4) using the eye-direction acceleration (acceleration calculated from the sensor output) and the supposable maximum acceleration error. When the order of the loop filter is the "third order", the loop bandwidth characteristic "$\theta_{e3}$ ($B_{PLL}$)" of the dynamic stress is calculated by Expression (5) using the eye-direction jerk (jerk calculated from the sensor output) and the supposable maximum jerk error.

More specifically, in Expressions (3) to (5), the loop bandwidth characteristics "$\theta_{en}$ ($B_{PLL}$)" of the dynamic stress are calculated where "the eye-direction component of the sensor-detected velocity+the eye-direction component of the supposable maximum velocity error" is represented by "dR/dt", "the eye-direction component of the sensor-detected acceleration+the eye-direction component of the supposable maximum acceleration error" is represented by "$dR^2/dt^2$", and "the eye-direction component of the sensor-detected jerk+the eye-direction component of the supposable maximum jerk error" is represented by "$dR^3/dt^3$".

One of the main characteristics of this embodiment is that the loop bandwidth characteristics "$\theta_{en}$ ($B_{PLL}$)" of the dynamic stress is calculated in consideration of the supposable maximum detection errors of the sensor-detected velocity, acceleration, and jerk in Expressions (3) to (5), instead of calculating the loop bandwidth characteristics "$\theta_{en}$ ($B_{PLL}$)" of the dynamic stress using only the sensor-detected velocity, acceleration, and jerk of the GPS receiver.

In Expressions (3) to (5), the loop bandwidth characteristics of the dynamic stress are calculated using the true values of the dynamic stress calculating quantities, but the true values are not clear. Accordingly, the loop bandwidth characteristics of the dynamic stress were calculated using the sensor-detected values of the dynamic stress calculating quantity in the related art. This embodiment is largely different from the related art, in that the loop bandwidth characteristics of the dynamic stress are calculated in consideration of the maximum detection error which can be included in the sensor-detected values.

When the loop bandwidth characteristic "$\sigma_{tPLL}$ ($B_{PLL}$)" of the thermal noise and the loop bandwidth characteristic "$\theta_{en}$ ($B_{PLL}$)" of the dynamic stress are calculated, the loop bandwidth characteristic "$\sigma_{PLL}$ ($B_{PLL}$)" of the total jitter can be calculated by Expression (1). The loop bandwidth "$B_{PLL}$" is optimized on the basis of the loop bandwidth characteristic "$\sigma_{PLL}$ ($B_{PLL}$)" calculated in this way.

The inventor experimented to check the loop bandwidth characteristics of the thermal noise, the dynamic stress, and the total jitter. Specifically, it was checked how the thermal noise "$\sigma_{tPLL}$", the dynamic stress "$\theta_{en}$", and the total jitter "$\sigma_{PLL}$" vary depending on the magnitude of the loop bandwidth "$B_{PLL}$" while changing the reception environment of the GPS satellite signal and the situation of movement of the GPS receiver.

Figure 4:
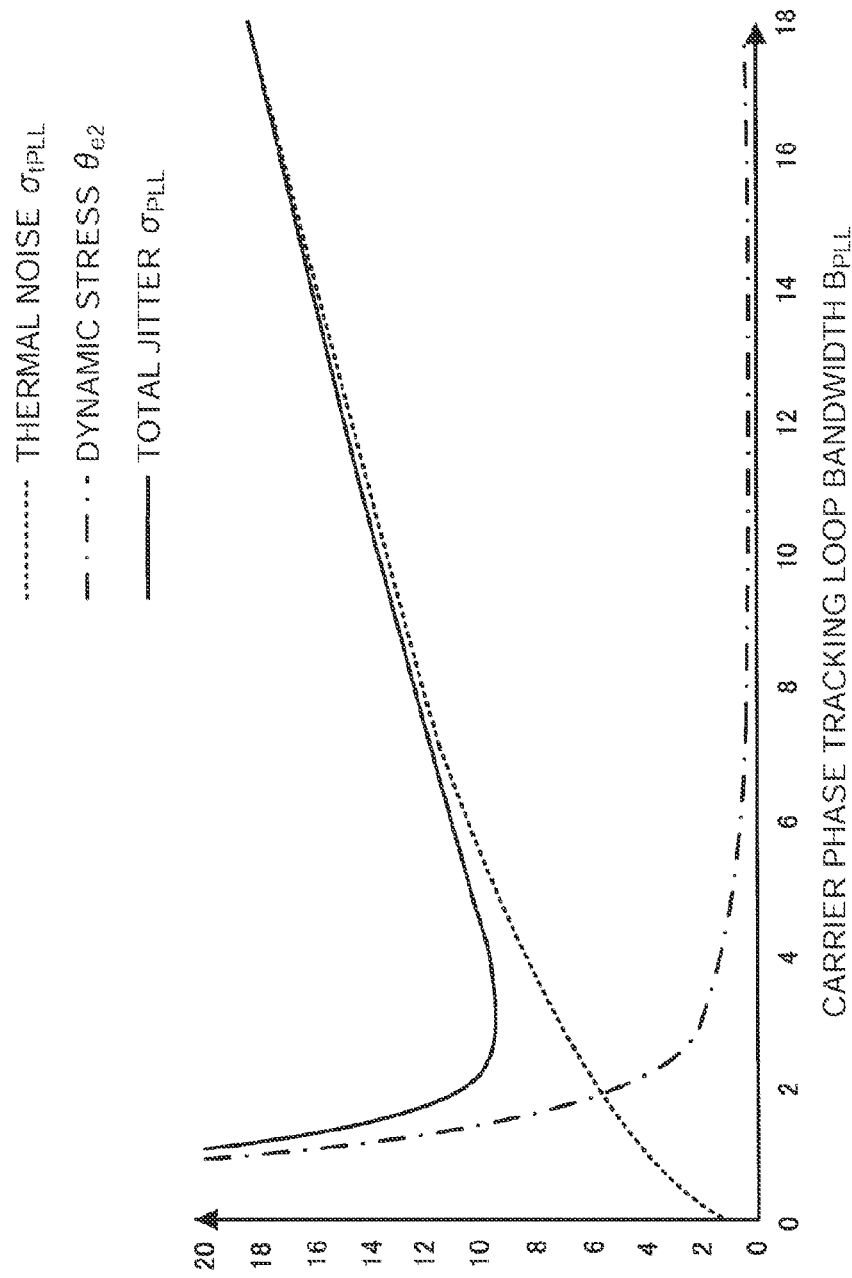
FIG. 4 is a diagram illustrating loop bandwidth characteristics of a thermal noise, a dynamic stress, and a total jitter.

FIG. 4 is a diagram illustrating the experiment result. The experiment was carried out under the conditions in which the order of the carrier phase tracking loop filter 254 is the "second order", the signal strength of the reception signal is 23 dB-Hz, the supposable maximum acceleration error is ±0.1 m/s², and the correlation integrating time is 20 ms. In FIG. 4, the horizontal axis represents the carrier phase tracking loop bandwidth "$B_{PLL}$", and the vertical axis represents the thermal noise "$\sigma_{tPLL}$", the dynamic stress "$\theta_{e2}$", and the total jitter "$\sigma_{PLL}$". Here, the thermal noise "$\sigma_{tPLL}$" is indicated by a dotted line, the dynamic stress "$\theta_{e2}$" is indicated by a one-dot chained line, and the total jitter "$\sigma_{PLL}$" is indicated by a solid line.

In this drawing, the thermal noise "$\sigma_{tPLL}$" tends to increase as the carrier phase tracking loop bandwidth "$B_{PLL}$" increases. On the other hand, the dynamic stress "$\theta_{e2}$" tends to decrease as the carrier phase tracking loop bandwidth "$B_{PLL}$" increases. The total jitter "$\sigma_{PLL}$" obtained by adding them has the minimum value at a certain loop bandwidth "$B_{PLL}$" and tends to increase as it moves away from the loop bandwidth "$B_{PLL}$".

Since the total jitter "$\sigma_{PLL}$" represents the magnitude of the variation of the carrier phase in the code phase tracking loop circuit, the total jitter "$\sigma_{PLL}$" is preferably small. Therefore, in this embodiment, it is intended to optimize the loop bandwidth "$B_{PLL}$" so as to minimize the total jitter "$\sigma_{PLL}$".

In Expression (1), the total jitter "$\sigma_{PLL}$" is expressed as a sum of the thermal noise "$\sigma_{tPLL}$" and the dynamic stress "$\theta_{en}$", but it is necessary to set the total jitter "$\sigma_{PLL}$" to a predetermined threshold value (for example, 15 deg) so as to properly track the carrier phase in the carrier phase tracking loop circuit.

As described above, the loop bandwidth characteristic of the dynamic stress "$\theta_{en}$" can be calculated in consideration of the supposable maximum detection errors of the velocity, the acceleration, and the jerk depending on the order of the loop filter. The supposable maximum detection errors are the maximum detection errors of the dynamic stress calculating quantities supposed in any period of time. The detection errors of the dynamic stress calculating quantities actually detected in the period of time are expected to be smaller than the supposable maximum detection errors. Nevertheless, the loop bandwidth characteristics of the dynamic stress are calculated using the supposable maximum detection errors instead of the actual detection errors, in order to give a margin to the increase in thermal noise "$\sigma_{tPLL}$" by estimating the dynamic stress as being great.

More specifically, when the carrier phase tracking loop bandwidth "$B_{PLL}$" is fixed, the dynamic stress "$\theta_{en}$" which can be calculated using the supposable maximum detection error is greater than the dynamic stress "$\theta_{en}$" which can be calculated using the actual detection error. In FIG. 4, the dynamic stress calculated using the supposable maximum detection error is indicated by the one-dot chained line, but the one-dot chained line indicating the dynamic stress is expected to shift to the left because the actual detection error is smaller than the supposable maximum detection error.

As described above, there is no problem when the total jitter is equal to or smaller than a predetermined threshold value. Therefore, the decrease in dynamic stress means that larger thermal noise is allowable with the same loop bandwidth. That is, in FIG. 4, when the one-dot chained line indicating the dynamic stress shifts to the left, the dotted line indicating the thermal noise is allowed to shift to the upside.

According to Expression (2), the thermal noise increases as the signal strength of the reception signal decreases (the signal is weakened). Therefore, in FIG. 4, the allowance of the dotted line of the thermal noise to shift to the upside means that the signal strength of the reception signal is allowed to decrease with the same loop bandwidth.

In this way, by optimizing the loop bandwidth using the supposable detection errors to give a margin to the increase of the thermal noise, it is possible to make it difficult to cause the lock failure and to improve the continuity of the tracking, even when the reception environment is changed to a weak electric-field environment such as an indoor environment in the course of tracking the GPS satellite signal.

As described above, when the total jitter "$\sigma_{PLL}$" is equal to or less than a predetermined threshold value (for example, 15 deg), it can be seen that the carrier phase can be properly tracked. Accordingly, this embodiment is not limited to the case where the loop bandwidth "$B_{PLL}$" is set to minimize the total jitter "$\sigma_{PLL}$", but the loop bandwidth "$B_{PLL}$" may be set to cause the total jitter "$\sigma_{PLL}$" to have a predetermined value (for example, a value slightly greater than the minimum value) equal to or less than a threshold value.

(2) Setting of Loop Bandwidth of Carrier Frequency Tracking Loop Filter

The existence of an error in the carrier frequency to be tracked causes a problem in tracking the carrier frequency in the carrier frequency tracking loop. The reasons for the carrier frequency error are the thermal noise and the dynamic stress.

For the purpose of specific explanation, the carrier frequency variation in the carrier frequency tracking loop circuit is formulated. Here, the carrier frequency variation is formulated in terms of frequencies (Hz). The thermal noise "$\sigma_{tFLL}$" in the carrier frequency tracking loop is given as Expression (6).

$$\sigma_{tFLL} = \frac{1}{2\pi T} \sqrt{\frac{4FB_{FLL}}{S}\left(1 + \frac{1}{TS}\right)} \text{ [Hz]} \tag{6}$$

In Expression (6), "$B_{FLL}$" represents the loop bandwidth of the carrier frequency tracking loop filter 256 and "F" is a constant. It can be seen from Expression (6) that the thermal noise "$\sigma_{tFLL}$" in the carrier frequency tracking loop is depending on the loop bandwidth "$B_{FLL}$" of the carrier frequency tracking loop filter 256, the signal strength "S" of the reception signal, and the correlation integrating time "T".

The dynamic stress "$f_e$" in the carrier frequency tracking loop is formulated in different expressions depending on the order of the carrier frequency tracking loop filter 256. Specifically, the dynamic stress "$f_{en}$" in the n-th order carrier frequency tracking loop filter 256 is given as Expression (7).

$$f_{en} = \lambda \cdot \frac{dR^{n+1}/dt^{n+1}}{B_{FLL}^n} \text{ [Hz]} \tag{7}$$

Here, "$\lambda$" is a constant and "R" represents a pseudo distance.

The total jitter "$\sigma_{FLL}$" in the carrier frequency tracking loop is given as Expression (8).

$$\sigma_{FLL} = \sigma_{tFLL} + \frac{f_{en}}{3} \text{ [Hz]} \tag{8}$$

Similarly to the carrier phase tracking loop filter 254, the loop bandwidth of the carrier frequency tracking loop filter 256 can be set. That is, the loop bandwidth characteristic "$\sigma_{FLL}(B_{FLL})$" of the total jitter is calculated by Expression (8) using the loop bandwidth characteristic "$\sigma_{tFLL}(\sigma_{FLL})$" of the thermal noise calculated by Expression (6) and the loop bandwidth characteristic "$f_{en}(B_{FLL})$" of the dynamic stress calculated by Expression (7). Then, the loop bandwidth "$B_{FLL}$" of the carrier frequency tracking loop filter 256 is optimized so as to minimize the total jitter "$\sigma_{FLL}$".

(3) Setting of Loop Bandwidth of Code Tracking Loop Filter

The existence of an error in the code phase to be tracked causes a problem in tracking the code phase in the code tracking loop circuit. The reasons for the code phase error are the thermal noise and the dynamic stress.

For the purpose of specific explanation, the code phase variation in the code tracking loop circuit is formulated. Here, the code phase variation is formulated in terms of the chips of the C/A code. The thermal noise "$\sigma_{tDLL}$" in the code tracking loop circuit is given as Expression (9).

$$\sigma_{tDLL} \sqrt{\frac{4F_1 d^2 B_{DLL}}{S}\left(2(1-d) + \frac{4F_2 d}{TS}\right)} \text{ [chips]} \tag{9}$$

In Expression (9), "$B_{DLL}$" represents the code tracking loop bandwidth and "$F_1$" and "$F_2$" are correlation coefficients. In addition, "d" represents a phase difference (spacing) of the Early code, the Prompt code, and the Late code. It can be seen from Expression (9) that the thermal noise "$\sigma_{tDLL}$" in the code tracking loop depends on the code tracking loop bandwidth "$B_{DLL}$", the signal strength "S" of the reception signal, and the correlation integrating time "T".

The dynamic stress "$D_e$" in the code tracking loop circuit is formulated in different expressions depending on the order of the code tracking loop filter 252. Specifically, the dynamic stress "$D_{en}$" in the n-th order code tracking loop filter 252 is given as Expression (10).

$$D_{en} = \eta \cdot \frac{dR^n/dt^n}{B_{PLL}^n} \text{ [chips]} \tag{10}$$

Here, "$\eta$" is a constant and "R" represents a pseudo distance.

The total jitter "$\sigma_{DLL}$" in the code tracking loop is given as Expression (11).

$$\sigma_{DLL} = \sigma_{tDLL} + \frac{D_{en}}{3} \text{ [chips]} \tag{11}$$

Similarly to the carrier phase tracking loop filter 254, the loop bandwidth of the code tracking loop filter 252 can be set. That is, the loop bandwidth characteristic "$\sigma_{DLL}(B_{DLL})$" of the total jitter is calculated by Expression (11) using the loop bandwidth characteristic "$\sigma_{tDLL}(B_{DLL})$" of the thermal noise calculated by Expression (9) and the loop bandwidth characteristic "$D_{en}(B_{DLL})$" of the dynamic stress calculated by Expression (10). Then, the loop bandwidth "$B_{DLL}$" of the code tracking loop filter 252 is optimized so as to minimize the total jitter "$\sigma_{DLL}$".

3. Data Structure (1) Data Structure of Storage Unit 90

As shown in FIG. 1, the storage unit 90 of the mobile phone 1 stores a main program 911 to be read and executed as a main process (see FIG. 5) by the host CPU 30, sensor data 921, a calibration time 922, a calibration time detection error 923, a dynamic stress calculating quantity 925, and a supposable maximum detection error 927. The main program 911 includes as a sub routine a calibration program 912 to be executed as a calibration process.

The main process is a process of carrying out the calling function, the mail transmission and reception function, the Internet function, and the like as the inherent functions of the mobile phone 1. The calibration process of the IMU 60 is performed, the supposable maximum detection error 927 is calculated on the basis of the elapsed time after performing the calibration process, and the calculated supposable maximum detection error is output to the baseband processing circuit unit 20 along with the dynamic stress calculating quantity 925. The main process will be described later in detail using a flowchart.

The calibration process is a process of calibrating the IMU 60 by causing the host CPU 30 to calculate values of error parameters such as a bias or a scale factor of the acceleration sensor 61 and the gyro sensor 63 of the IMU 60 and to perform a process of correcting the sensor output from the acceleration sensor 61 or the gyro sensor 63 using the calculated values of the error parameters.

The sensor data 921 is data including the accelerations and the angular velocities which are detected by the acceleration sensor 61 and the gyro sensor 63 of the IMU 60 and stored in time series, and is updated whenever the detection result is output from the IMU 60.

The calibration time 922 is a time when the calibration process of the IMU 60 is finally performed by the host CPU 30. The calibration time detection error 923 is a detection error of the dynamic stress calculating quantity at the calibration time 922.

The dynamic stress calculating quantity 925 is a quantity used to calculate the dynamic stress. As described with reference to FIG. 3, the "velocity", the "acceleration", and the "jerk" are used as the dynamic stress calculating quantity when the order of the loop filter included in the satellite signal tracking unit 25 is the "first order", the "second order", and the "third order", respectively.

The supposable maximum detection error 927 is the detection error of the dynamic stress calculating quantity calculated on the basis of the elapsed time from the calibration time 922 and is the maximum detection error which can be supposed.

(2) Data Structure of Storage Unit 29

As shown in FIG. 2, the storage unit 29 of the baseband processing circuit unit 20 stores a baseband processing program 291 to be read and executed as a baseband process (see FIG. 6) by the processing unit 27, satellite orbit data 293, a dynamic stress calculating quantity 295, and a supposable maximum detection error 297.

The baseband processing program 291 includes, as sub routines, a code tracking loop bandwidth setting program 2911 executed as a loop bandwidth setting process of the code tracking loop filter, a carrier phase tracking loop bandwidth setting program 2913 to be executed as a loop bandwidth setting process (see FIG. 7) of the carrier phase tracking loop filter, and a carrier frequency tracking loop bandwidth setting program 2915 to be executed as a loop bandwidth setting process of the carrier frequency tracking loop filter.

The satellite orbit data 293 is almanac data including rough satellite orbit information of all GPS satellites or ephemeris data including detailed satellite orbit information of all GPS satellites. The satellite orbit data 293 is acquired by decoding the GPS satellite signals received from the GPS satellites or is acquired from a base station or an assist server of the mobile phone 1.

The dynamic stress calculating quantity 295 and the supposable maximum detection error 297 are the same data as the dynamic stress calculating quantity 925 and the supposable maximum detection error 927 stored in the storage unit 90.

4. Flow of Processes (1) Processes of Host CPU 30

Figure 5:
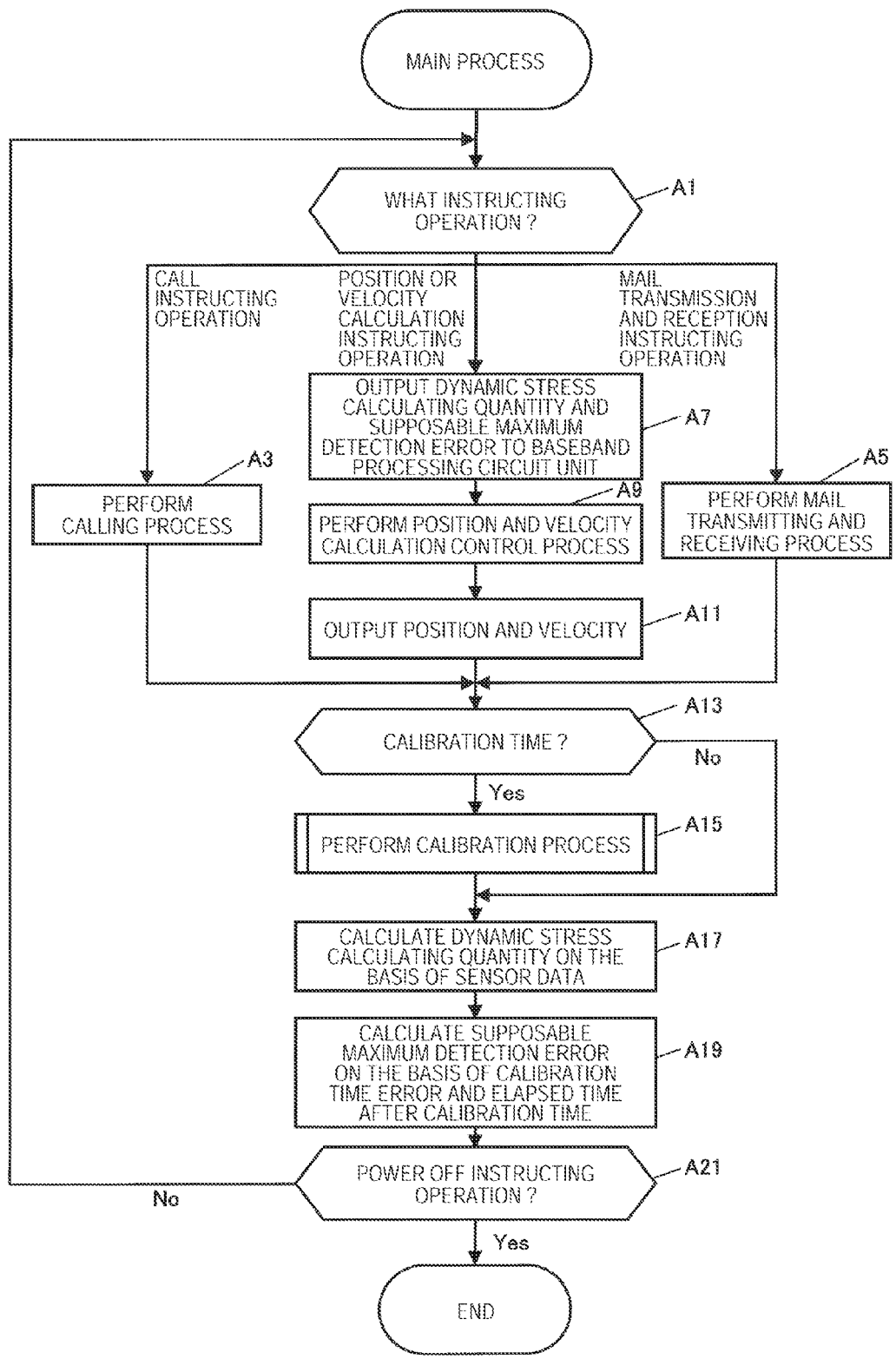
FIG. 5 is a flowchart illustrating the flow of a main process.

FIG. 5 is a flowchart illustrating the flow of the main process to be executed in the mobile phone 1 by causing the host CPU 30 to read and execute the main program 911 stored in the storage unit 90.

First, the host CPU 30 determines an instructing operation carried out by a user through the use of the operation unit 40 (step A1), and performs a calling process when it is determined that the instructing operation is a call instructing operation (call instructing operation in step A1) (step A3). Specifically, the mobile-phone wireless communication circuit unit 80 is caused to communicate with a base station to establish a call between the mobile phone 1 and another mobile phone.

When it is determined in step A1 that the instructing operation is a mail transmission and reception instructing operation (mail transmission and reception instructing operation in step A1), the host CPU 30 performs a mail transmitting and receiving process (step A5). Specifically, the host CPU 30 causes the mobile-phone wireless communication circuit unit 80 to communicate with the base station to establish mail transmission and reception between the mobile phone 1 and another mobile phone.

When it is determined in step A1 that the instructing operation is a position and velocity calculation instructing operation (position and velocity calculating instructing operation in step A1), the host CPU 30 outputs the dynamic stress calculating quantity 925 and the supposable maximum detection error 927 stored in the storage unit 90 to the processing unit 27 of the baseband processing circuit unit 20 (step A7).

Then, the host CPU 30 performs a position and velocity calculation control process of causing the processing unit 27 to calculate a position and a velocity (step A9). The host CPU 30 acquires the calculated position and velocity from the processing unit 27 and outputs the acquired position and velocity to the display unit 50 to display the position and velocity (step A11).

After performing the processes of steps A3 to A11, the host CPU 30 determines whether it is a time to perform the calibration process (step A13). The time to perform the calibration process can be set to any time.

For example, the time to perform the calibration process may be set to a time when the elapsed time after turning on the mobile phone 1 or the elapsed time after previously performing the calibration process is a predetermined time (for example, 1 hour) or a time when a temperature variation of a predetermined temperature (for example, 5° C.) or more from the temperature at the time of turning on the mobile phone 1 or the temperature at the time of previously performing the calibration process. In the latter, a temperature sensor is further provided. The time to perform the calibration process may be set to a time when a user instructs to perform the calibration process.

When it is determined that it is not a time to perform the calibration process (No in step A13), the host CPU 30 performs the process of step A17. When it is determined that it is a time to perform the calibration process (Yes in step A13), the host CPU 30 performs the calibration process by reading and executing the calibration program 912 stored in the storage unit 90 (step A15).

The calibration process is carried out by calculating the values of error parameters such as biases and scale factors of the sensors of the IMU 60 using a known method. The bias means an error value given normally and the scale factor means a ratio of a variation of an output value to a variation of an input value to be measured, that is, the sensitivity of a sensor.

Subsequently, the host CPU 30 calculates the dynamic stress calculating quantity 925 on the basis of the sensor data 921 stored in the storage unit 90 and updates the storage unit 90 (step A17). The host CPU 30 calculates the supposable maximum detection error 927 on the basis of the calibration time 922 and the calibration time detection error 923 stored in the storage unit 90 and then updates the storage unit 90 (step A19).

Specifically, when the calibration time detection error 923 is "$E_C$", "$E_{MAX}$" which is the supposable maximum detection error 927 is calculated using Expression (12).

$$E_{MAX} = k \cdot E_c \quad (12)$$

In Expression (12), "k" is a coefficient having a positive correlation with the elapsed time "Δt" from the calibration time. That is, as the elapsed time "Δt" increases, the coefficient "k" increases and the calculated supposable maximum detection error "$E_{MAX}$" also increases. Expression (12) is an example of an operational expression of the supposable maximum detection error and the supposable maximum detection error may be calculated using other operational expressions. An operational expression such that the supposable maximum detection error "$E_{MAX}$" increases as the elapsed time "Δt" from the calibration time increases may be determined.

Subsequently, the host CPU 30 determines whether the user instructs to turn off the power source through the use of the operation unit 40 (step A21), and performs the process of step A1 again when it is determined that the user does not instruct to turn off the power source (No in step A21). When it is determined that the user instructs to turn off the power source (Yes in step A21), the main process is ended.

(2) Processes of Processing Unit 27

Figure 6:
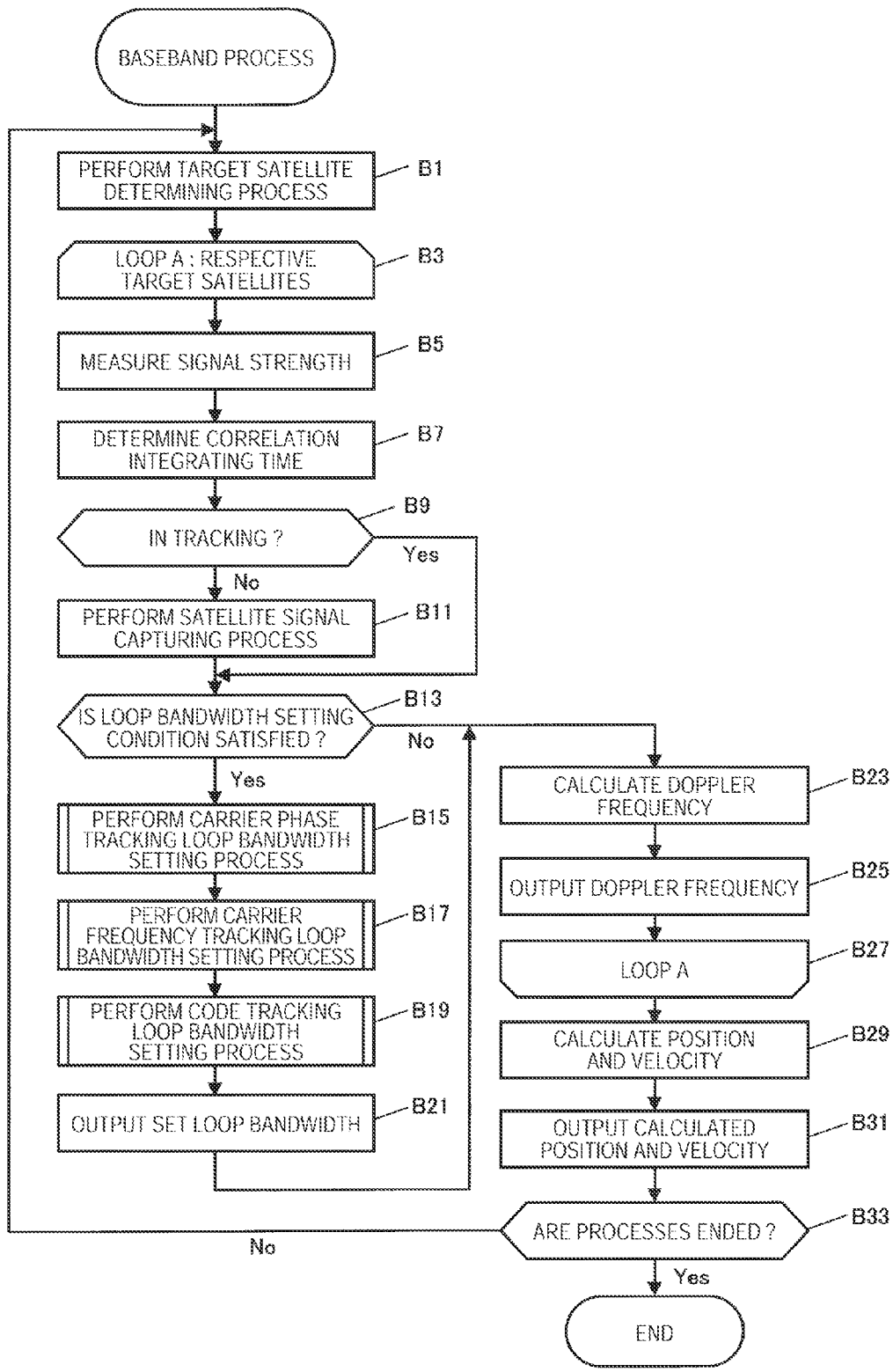
FIG. 6 is a flowchart illustrating the flow of a baseband process.

FIG. 6 is a flowchart illustrating the flow of the baseband process to be performed by the baseband processing circuit unit 20 by causing the processing unit 27 to read and execute the baseband processing program 291 stored in the storage unit 29.

First, the processing unit 27 performs a target satellite determining process (step B1). Specifically, the processing unit 27 determines and sets a GPS satellite located in the sky at a given reference position at the current time counted by a timepiece unit not shown as a target satellite using the satellite orbit data 293 stored in the storage unit 29. For example, the reference position can be set to a position acquired from an assist server by a so-called server assist at the time of first calculating a position after turning on the power source and can be set to the newest calculated position at the time of second or later calculating a position.

The processing unit 27 performs the processes of loop A on each target satellite determined in step B1 (steps B3 to B27). In the processes of loop A, the processing unit 27 measures the signal strength of the GPS satellite signal received from the target satellite (step B5). The correlation integrating time determining unit 271 determines the correlation integrating time when the correlation processor 231 performs the correlation integrating process on the GPS satellite signal received from the target satellite (step B7).

The correlation integrating time can be determined by various methods. For example, the correlation integrating time may be determined on the basis of the signal strength of the GPS satellite signal measured in step B5. As the signal strength decreases, the correlation values have to be integrated for a longer time, thereby hardly detecting the peak of the correlation values. Accordingly, it is preferable that the correlation integrating time should be elongated as the signal strength decreases. For example, when the signals strength satisfies a predetermined low signal strength condition (for example, signal strength≤low signal strength threshold), the correlation integrating time may be set to "20 ms". When the signal strength does not satisfy the low signal strength condition, the correlation integrating time may be set to "10 ms".

The reception environment of the GPS satellite signal may be determined and the correlation integrating time may be determined on the basis of the determined reception environment. For example, the correlation integrating time may be set to "20 ms" when the reception environment is an "indoor environment", and the correlation integrating time may be set to "10 ms" when the reception environment is an "outdoor environment".

Thereafter, the processing unit 27 determines whether the GPS satellite signal from the target satellite is being tracked by the satellite signal tracking unit 25 (step B9), and performs the process of step B13 when it is determined that the GPS satellite signal is being tracked (Yes in step B9). When it is determined that the GPS satellite signal is not being tracked (No in step B9), the processing unit 27 performs the satellite signal capturing process and causes the satellite signal capturing unit 23 to capture the GPS satellite signal from the target satellite (step B11).

Then, the processing unit 27 determines whether the loop bandwidth setting condition is established (step B13), and performs the process on the next target satellite when it is determined that the loop bandwidth setting condition is not established (No in step B13). When it is determined that the loop bandwidth setting condition is established (Yes in step B13), the processing unit 27 performs the carrier phase tracking loop bandwidth setting process by reading and executing the carrier phase tracking loop bandwidth setting program 2913 stored in the storage unit 29 (step B15).

Figure 7:
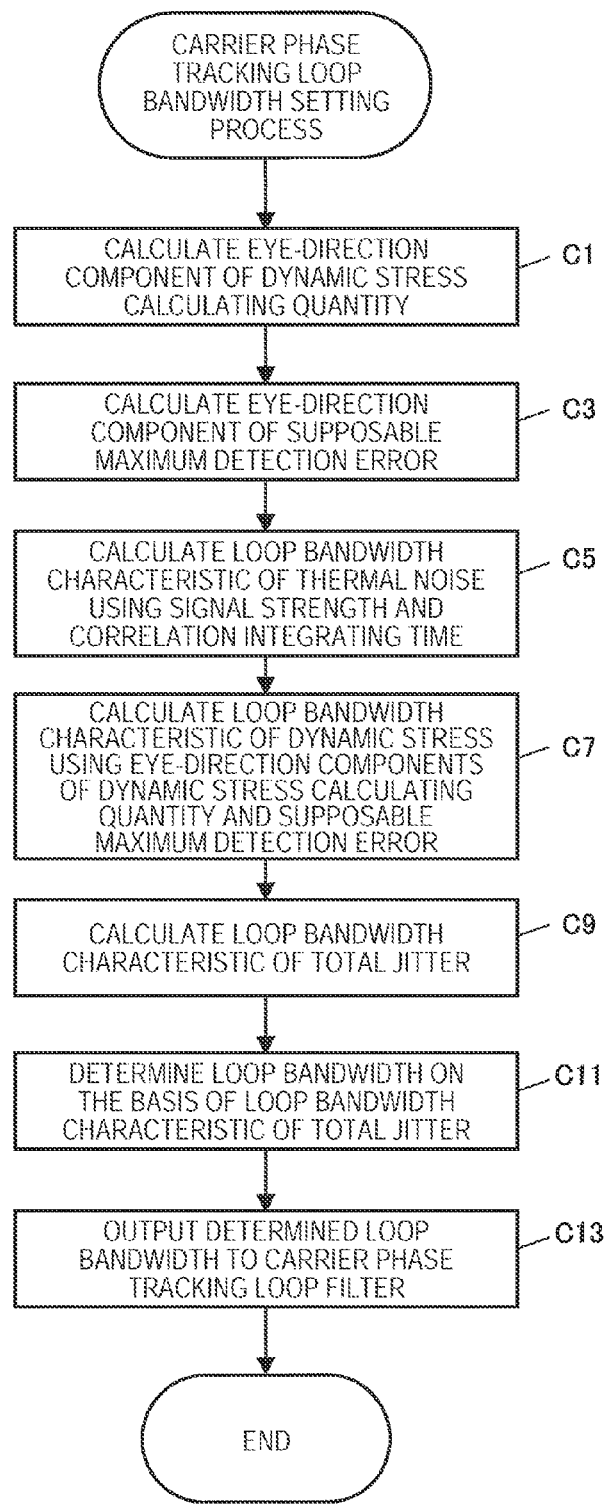
FIG. 7 is a flowchart illustrating the flow of a carrier phase tracking loop bandwidth setting process.

FIG. 7 is a flowchart illustrating the flow of the carrier phase tracking loop bandwidth setting process. First, the loop bandwidth setter 273 calculates an eye-direction component of the dynamic stress calculating quantity 295 stored in the storage unit 29 (step C1). The loop bandwidth setter 273 also calculates an eye-direction component of the supposable maximum detection error 297 stored in the storage unit 29 (step C3).

The eye direction is a direction directed from the mobile phone 1 to the target satellite. Accordingly, the eye direction can be acquired by using the newest calculated position of the mobile phone 1 and the newest satellite position of the target satellite calculated using the satellite orbit data 293. The dynamic stress calculating quantity 295 and the supposable maximum detection error 297 can be projected in the acquired eye direction.

Then, the loop bandwidth setter 273 calculates the loop bandwidth characteristic "$\sigma_{tPLL}(B_{PLL})$" of the thermal noise through the use of Expression (2) using the signal strength "S" of the target satellite measured in step B5 and the correlation integrating time "T" of the target satellite determined in step B7 (step C5).

The loop bandwidth setter 273 calculates the loop bandwidth characteristic "$\theta_{en}(B_{PLL})$" of the dynamic stress through the use of Expressions (3) to (5) using the eye-direction component of the dynamic stress calculating quantity 295 calculated in step C1 and the eye-direction component of the supposable maximum detection error 297 calculated in step C3 (step C7).

The loop bandwidth setter 273 calculates the loop bandwidth characteristic "$\sigma_{PLL}(B_{PLL})$" of the total jitter through the use of Expression (1) using the loop bandwidth characteristic "$\sigma_{tPLL}(B_{PLL})$" of the thermal noise calculated in step C5 and the loop bandwidth characteristic "$\theta_{en}(B_{PLL})$" of the dynamic stress calculated in step C7 (step C9).

Then, the loop bandwidth setter 273 determines the carrier phase tracking loop bandwidth "$B_{PLL}$" on the basis of the loop bandwidth characteristic "$\sigma_{PLL}(B_{PLL})$" of the total jitter calculated in step C9 (step C11). That is, the carrier phase tracking loop bandwidth "$B_{PLL}$" is optimized so as to minimize the total jitter "$\sigma_{PLL}$".

The loop bandwidth setter 273 outputs the determined carrier phase tracking loop bandwidth "$B_{PLL}$" to the carrier phase tracking loop filter 254 (step C13) and ends the carrier phase tracking loop bandwidth setting process.

Referring to the baseband process of FIG. 6 again, after performing the carrier phase tracking loop bandwidth setting process, the processing unit 27 performs the carrier frequency tracking loop bandwidth setting process by reading and executing the carrier frequency tracking loop bandwidth setting program 2915 stored in the storage unit 29 (step B17). The processing unit 27 performs the code tracking loop bandwidth setting process by reading and executing the code tracking loop bandwidth setting program 2911 stored in the storage unit 29 (step B19).

The carrier frequency tracking loop bandwidth setting process and the code tracking loop bandwidth setting process can be performed in the same way as the carrier phase tracking loop bandwidth setting process as described in the principle. Accordingly, the flows of the carrier frequency tracking loop bandwidth setting process and the code tracking loop bandwidth setting process will not be shown nor described in the flowchart.

After setting the loop bandwidths of various loop filters, the Doppler calculator 275 calculates the Doppler frequency of the GPS satellite signal received from the target satellite (step B23). The Doppler frequency can be calculated using the velocity of the mobile phone 1 calculated by integrating the acceleration detected by the acceleration sensor 61 and the satellite velocity of the target satellite calculated using the satellite orbit data 293.

The Doppler calculator 275 outputs the calculated Doppler frequency to the carrier-removing signal generator 213 (step B25) and performs the flow of processes on the next target satellite. After performing the processes of steps B5 to B25 on all the target satellites, the processing unit 27 ends the processes of loop A (step B27).

Thereafter, the position and velocity calculator 277 performs the position calculating process using the captured GPS satellite signals for the target satellites (step B29). The position calculating process can be carried out, for example, by performing a known convergence calculation using the least square method or the Kalman filter on the basis of the pseudo distances between the mobile phone 1 and the target satellites. The velocity calculation can be performed, for example, by a known method using temporal variations of reception frequencies of the GPS satellite signals received from the target satellites.

Subsequently, the processing unit 27 outputs the calculated position and velocity to the host CPU 30 (step B31). The processing unit 27 determines whether the flow of processes should be ended (step B33) and performs the process of step B1 again when it is determined that the flow of processes should not be ended yet (No in step B33). When it is determined that the flow processes should be ended (Yes in step B33), the processing unit 27 ends the baseband process.

5. Operational Advantages

In the mobile phone 1, the situation of movement is detected by the IMU 60. The supposable maximum detection error which is the maximum detection error supposable in the IMU 60 is calculated by the host CPU 30. The loop bandwidths of the loop filters in the tracking loop circuit for tracking the GPS satellite signal received from the GPS satellite is set by the processing unit 27 of the baseband processing circuit unit 20 using the detection result of the IMU 60 and the supposable maximum detection error.

The jitters of the code phase, the carrier phase, and the carrier frequency in the loop circuit for tracking the GPS satellite signal can greatly vary depending on the situation of movement of the mobile phone 1. Accordingly, the loop bandwidths of the tracking loop filters are preferably set using the detection results of the IMU 60. However, errors can be naturally included in the detection results of the IMU 60. Accordingly, by setting the loop bandwidths in consideration of the detection error of the IMU 60 in addition to the detection result of the IMU 60, it is possible to set the loop bandwidths to proper values.

In this embodiment, the supposable maximum detection error which can be included in the dynamic stress calculating quantity is calculated depending on the orders of the loop filters and the loop bandwidth characteristic of the dynamic stress is calculated in consideration of the supposable maximum detection error. Accordingly, it is possible to give a margin to the increase in thermal noise. This hardly causes a lock failure in a weak electric field environment such as an indoor environment, thereby continuously tracking the GPS satellite signal.

6. Modified Examples 6-1. Electronic Apparatus

Although it has been described in the above-mentioned embodiment that the invention is applied to a mobile phone which is a kind of electronic apparatus, the electronic apparatus to which the invention can be applied is not limited to the mobile phone. For example, the invention may be applied to other electronic apparatuses such as a car navigation apparatus, a portable navigation apparatus, a PC, a PDA (Personal Digital Assistant), and a wristwatch.

6-2. Position Calculating System

Although the GPS has been used as the position calculating system in the above-mentioned embodiment, position calculating systems using other satellite positioning systems such as a WAAS (Wide Area Augmentation System), a QZSS (Quasi Zenith Satellite System), a GLONASS (GLObal NAvigation Satellite System), and a GALILEO may be used.

6-3. Detection of Situation of Movement

Although it has been described in the above-mentioned embodiment that the situation of movement of the mobile phone 1 is detected using the acceleration detected by the acceleration sensor 61 of the IMU 60, the situation of movement may be detected using an angular velocity detected by the gyro sensor 63 of the IMU 60. Instead of the IMU 60 or in addition to the IMU 60, a velocity sensor detecting the velocity of the mobile phone 1 may be provided and the situation of movement may be detected using the moving velocity detected by the velocity sensor.

6-4. Setting of Loop Bandwidth using Reception Environment of GPS Satellite Signal In the above-mentioned embodiment, it has been described that the loop bandwidth is set to a value suitable for the measured signal strength by measuring the signal strength of the GPS satellite signal and calculating the loop bandwidth characteristic of the thermal noise using the measured signal strength. However, since the signal strength of the GPS satellite signal is closely associated with the reception environment, the loop bandwidth characteristic of the thermal noise may be calculated using the reception environment such as an indoor environment and an outdoor environment.

For example, as shown in FIG. 8, a table in which the reception signal strength of the GPS satellite signal is correlated with the reception environment of the GPS satellite signal is stored in the storage unit 29. In the table shown in FIG. 8, the reception environments represented by A, B, C, D, . . . represent the reception environments of the GPS satellite signals such as an indoor environment, an outdoor environment, an urban canyon environment, and a multi-path environment. The reception environments A, B, C, D, . . . are correlated with the signal strengths Sa, Sb, Sc, Sd, . . . of the GPS satellite signal and stored.

The processing unit 27 determines the reception environment of the GPS satellite signal from a target satellite and reads the signal strength correlated with the determined reception environment. The processing unit 27 calculates the loop bandwidth characteristic of the thermal noise using Expression (2) on the basis of the read signal strength. Then, the processing unit 27 sets the loop bandwidth to a value suitable for the determined reception environment using the calculated loop bandwidth characteristic of the thermal noise and the calculated loop bandwidth characteristic of the dynamic stress.

Since information such as a PDOP (Position Dilution of Precision) value as an indicator indicating a geometric sky arrangement of the GPS satellites or an elevation angle of a GPS satellite is also closely associated with the reception environment, the loop bandwidths may be set using the information. The reception environment is more excellent as the PDOP value is smaller and the reception environment is more excellent as the elevation angle is higher. Accordingly, the loop bandwidth characteristic of the thermal noise can be calculated using this relation in the same manner as described above.

6-5. Setting of Loop Bandwidth

In the above-mentioned embodiment, it has been described that the loop bandwidths of the loop filters are set to minimize the total jitters in the loop circuits. However, as described in principle, the loop bandwidths may be set to make the total jitters equal to or less than a predetermined threshold value, instead of setting the loop bandwidths so as to minimize the total jitters.

The entire disclosure of Japanese Patent Applications No. 2010-025835, filed on Feb. 8, 2010 and No. 2010-238738, filed on Oct. 20, 2010 are expressly incorporated by reference herein.

What is claimed is:

1. A satellite signal tracking method comprising:
receiving a satellite signal from a positioning satellite;
receiving a measurement of a situation of movement from at least one sensor;
calculating an error of the measurement;
determining a jitter of a tracking loop circuit, the jitter including a dynamic stress, the dynamic stress being calculated based on the measurement of the situation of movement and the error of the measurement, and the tracking loop circuit being used to track the received satellite signal; and
setting a loop bandwidth of the tracking loop circuit based on the jitter.

2. The satellite signal tracking method according to claim 1, wherein the at least one sensor includes one of an acceleration sensor, a velocity sensor, and a gyro sensor, and
wherein the error of the measurement is calculated based on an amount of time that has elapsed since the at least one sensor was calibrated.

3. The satellite signal tracking method according to claim 1, wherein the setting of the loop bandwidth includes setting the loop bandwidth based on a temperature of the satellite signal reception environment or a signal strength of the satellite signal.

4. The satellite signal tracking method according to claim 1, wherein the setting of the loop bandwidth includes setting the loop bandwidth based on a filter order of the tracking loop circuit.

5. A position calculating method comprising:
tracking the satellite signal by performing the satellite signal tracking method according to claim 1; and
calculating a position using the tracked satellite signal.

6. A position calculating device comprising:
at least one sensor selected from an acceleration sensor, a velocity sensor, and a gyro sensor;
a movement situation detecting unit that detects a situation of movement using an output of the at least one sensor;
a tracking loop circuit that is used to track a satellite signal from a positioning satellite and of which a loop bandwidth can be changed;
a jitter determination unit that determines a jitter of the tracking loop circuit, the jitter including a dynamic stress that is calculated based on the detection result of the movement situation detecting unit and a detection error of the detection result;
a loop bandwidth setting unit that sets the loop bandwidth of the tracking loop circuit based on the jitter; and
a position calculating unit that calculates a position using the satellite signal tracked by the tracking loop circuit.

7. The satellite signal tracking method of claim 1, wherein the loop bandwidth of the tracking loop circuit is set to a bandwidth value for adjusting the jitter to be less than or equal to a predetermined threshold.

8. The satellite signal tracking method of claim 1, wherein the loop bandwidth of the tracking loop circuit is set to a bandwidth value for minimizing the jitter.

* * * * *